(12) United States Patent
Bambila

(10) Patent No.: US 12,077,299 B2
(45) Date of Patent: Sep. 3, 2024

(54) HIGH-EFFICIENT SILICONE HEATER

(71) Applicant: GOODRICH CORPORATION, Charlotte, NC (US)

(72) Inventor: Gururaja Bambila, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/881,291

(22) Filed: Aug. 4, 2022

(65) Prior Publication Data

US 2023/0373632 A1 Nov. 23, 2023

(30) Foreign Application Priority Data

May 18, 2022 (IN) .............................. 202241028605

(51) Int. Cl.
*B64D 11/02* (2006.01)
*F16L 53/30* (2018.01)

(52) U.S. Cl.
CPC .............. *B64D 11/02* (2013.01); *F16L 53/30* (2018.01)

(58) Field of Classification Search
CPC ................................. F16L 53/30; B64D 11/02
USPC .......................................................... 138/33
See application file for complete search history.

(56) References Cited

U.S. PATENT DOCUMENTS

| | | | |
|---|---|---|---|
| 4,281,238 A * | 7/1981 | Noma | H05B 3/58 219/535 |
| 5,086,836 A | 2/1992 | Barth et al. | |
| 5,632,919 A * | 5/1997 | MacCracken | H01J 37/3244 219/535 |
| 5,714,738 A * | 2/1998 | Hauschulz | H05B 3/58 219/535 |
| 5,910,266 A | 6/1999 | Jones | |
| 7,220,947 B2 * | 5/2007 | Cardenas | H05B 3/565 138/33 |
| 9,435,477 B2 | 9/2016 | Mustafa et al. | |
| 9,578,689 B2 | 2/2017 | Smith et al. | |
| 10,932,326 B2 * | 2/2021 | Venkataramu | B29C 63/0073 |
| 2003/0210902 A1 * | 11/2003 | Giamati | H01C 3/20 392/444 |
| 2007/0119848 A1 * | 5/2007 | Ellis | F16L 53/38 219/541 |
| 2015/0014301 A1 * | 1/2015 | Strehlow | H05B 3/26 219/541 |
| 2020/0116388 A1 | 4/2020 | Roach et al. | |

OTHER PUBLICATIONS

European Patent Office, European Search Report dated Oct. 18, 2023 in Application No. 23172359.4.

* cited by examiner

*Primary Examiner* — David R Deal
(74) *Attorney, Agent, or Firm* — SNELL & WILMER L.L.P.

(57) ABSTRACT

A silicone heater assembly is provided. The silicone heater includes a heater and a thermal pad. The thermal pad is configured to couple to the heater. The thermal pad is configured to conform to a plumbing infrastructure to be heated.

19 Claims, 4 Drawing Sheets

HIGH-EFFICIENT SILICONE HEATER

CROSS-REFERENCE TO RELATED APPLICATIONS

This application claims priority to, and the benefit of, India Patent Application No. 202241028605, filed May 18, 2022 (DAS Code AC33) and titled "HIGH-EFFICIENT SILICONE HEATER," which is incorporated by reference herein in its entirety for all purposes.

FIELD

The present disclosure relates to aircraft systems, and more specifically, to heaters for freeze protection of aircraft water systems.

BACKGROUND

To prevent freezing of potable water and water-based waste, heaters are incorporated along the aircraft plumbing (e.g., along the exterior surfaces of the pipes, fittings, tanks, etc.). Heating is the primary method used for preventing freezing in water systems of an aircraft. Silicone substrate based resistive heaters are predominantly being used for this purpose by covering the surface of the components to be heated. Advantageously, the silicone substrate in freeze protection heater can be molded to any complex shape. The intent in such a heater design is to maintain surface contact between the heater and the component to be heated in order to achieve maximum heat transfer. This may not be feasible in all cases due to complexity of heater manufacturing, tooling and cost increase with complexity.

SUMMARY

A silicone heater assembly is disclosed herein. In accordance with various embodiments, the silicone heater includes a heater and a thermal pad. The thermal pad is configured to couple to the heater. The thermal pad is configured to conform to a component to be heated.

In various embodiments, the thermal pad is configured to couple to an inner surface of the heater.

In various embodiments, the thermal pad is configured to contact all surfaces of the component to be heated such that heat transfer efficiency is increased.

In various embodiments, the thermal pad is configured in a tubular form such that the thermal pad is configured to be slid on over the component to be heated.

In various embodiments, the component to be heated is it is a conduit, a fitting, or a valve.

In various embodiments, the thermal pad is configured to be installed prior to the installation of the heater.

In various embodiments, the silicone heater assembly includes an adhesive. The adhesive is compatible with the heater and the thermal pad, and is configured to adhere the heater and the thermal pad.

In various embodiments, the thermal pad is a high thermal conductive material with the range up to 17 W/m-K.

In various embodiments, the thermal pad is a silicone based material.

In various embodiments, the thermal pad is a non-silicone based material.

An aircraft potable water and wastewater system is also disclosed herein. In accordance with various embodiments, the aircraft potable and wastewater system includes a tank, a conduit fluidly connected to the tank, and a silicone heater assembly coupled to an exterior surface of at least one of the tank or the conduit. The silicone heater assembly includes a heater and a thermal pad configured to couple to the heater. The thermal pad is configured to conform to the exterior surface of at least one of the tank or the conduit.

In various embodiments, the thermal pad is configured to couple to an inner surface of the heater.

In various embodiments, aircraft potable water and wastewater system includes a fitting and a valve fluidly coupled to the conduit.

In various embodiments, the heater is configured in a step formation to align with the fitting and the valve such that air gaps are formed between the fitting and the heater.

In various embodiments, the thermal pad is configured to fill the air gaps between the fitting and the heater.

In various embodiments, the heater is configured in a straight formation such that air gaps are formed between the fitting, the valve, and the heater.

In various embodiments, the thermal pad is configured to fill the air gaps between the fitting, the valve, and the heater.

In various embodiments, the thermal pad is configured in a tubular form such that the thermal pad is configured to be slid on over the component to be heated.

In various embodiments, the thermal pad is configured to be installed prior to the installation of the heater.

In various embodiments, the aircraft potable water and wastewater system includes an adhesive. The adhesive is compatible with the heater and the thermal pad, and is configured to adhere the heater and the thermal pad.

The foregoing features and elements may be combined in various combinations without exclusivity, unless expressly indicated herein otherwise. These features and elements as well as the operation of the disclosed embodiments will become more apparent in light of the following description and accompanying drawings.

Figure 1:
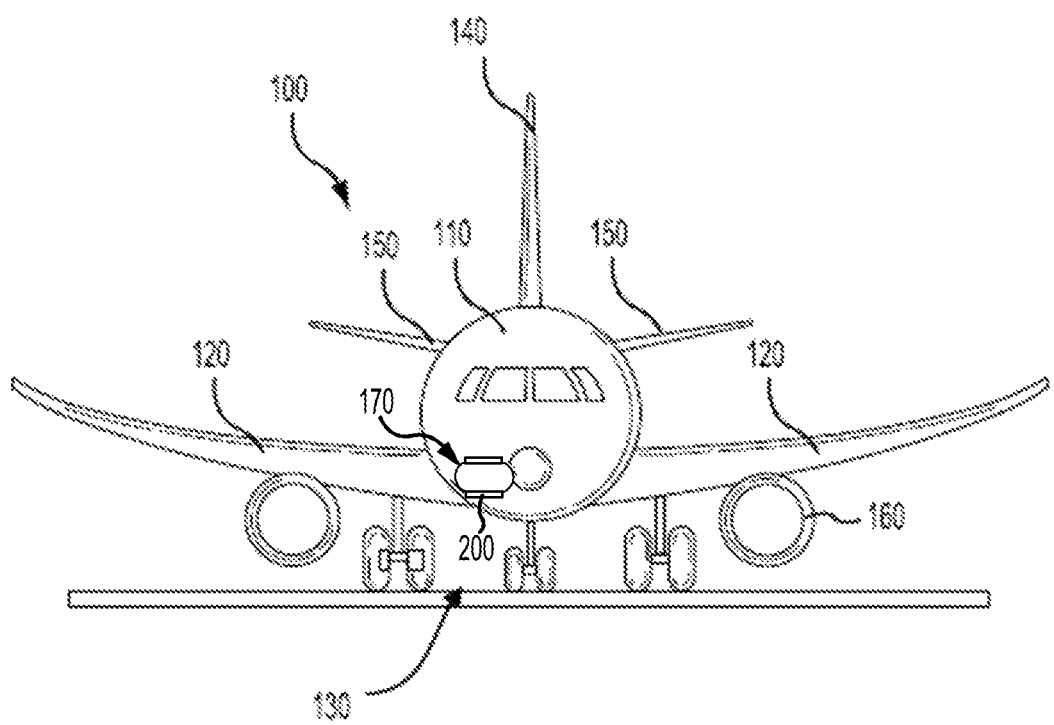
FIG. 1 illustrates an aircraft, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Referring now to FIG. 1, a front view of an aircraft 100 is illustrated in accordance with various embodiments. The aircraft 100 comprises a fuselage 110, wings 120 extending outward from the fuselage 110, a landing gear system 130, a vertical stabilizer 140, horizontal stabilizers 150 and engines 160. In various embodiments, fuselage 110 defines an aircraft cabin therein. In this regard, passengers may board the aircraft 100 and sit within the aircraft cabin during travel. The aircraft cabin includes at least one lavatory disposed therein. Aircraft 100 may have a potable water and wastewater system 170. As described in further detail below, a silicone heater assembly 200 may be employed on one or more components of the potable water and wastewater system 170 for freeze portion. In this regard, the silicone heater assembly 200 may be employed to prevent, or reduce, occurrence of the waste liquid in component freezing. Although described herein with respect to wastewater systems, the present disclosure is not limited in this regard. For example, the silicone heater assembly 200 may be employed on components of a potable water system or any other fluid systems located in non-pressurized zones of aircraft 100.

Figure 2:
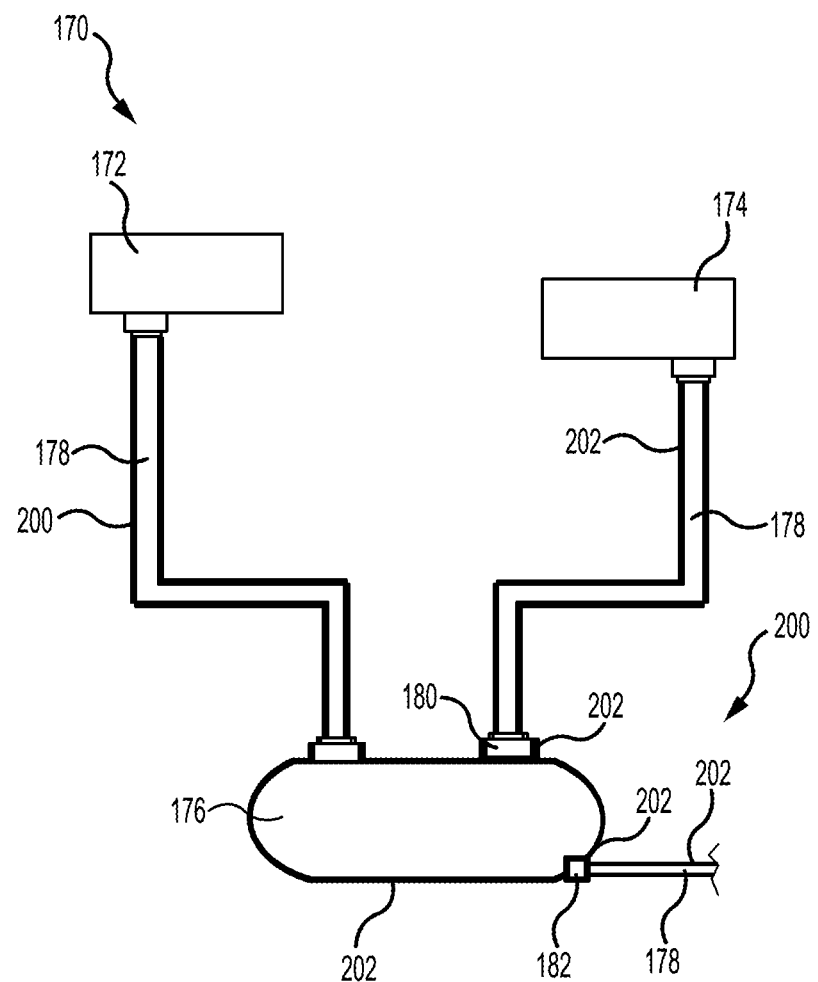
FIG. 2 illustrates an aircraft potable water and wastewater system having a silicone heater assembly, in accordance with various embodiments.

With reference to FIG. 2, potable water and wastewater system 170 is illustrated. In accordance with various embodiments, water, or other liquid waste, from sink 172 and toilet 174 may be deposited into tank 176 (e.g., a waste tank) via conduits 178, and/or from tank 176 via conduits 178. In accordance with various embodiments, heaters 202, as described in further detail below, are coupled to the exterior surface of one or more components of the potable water and wastewater system 170. For example, heaters 202 may be located around the exterior surface of conduits 178 and/or tank 176. Heaters 202 may also be located on the exterior surface of conduit fittings 180 and/or valves 182. Conduit fittings 180 may fluidly connect one or more conduits 178 to one another and/or to other components of the potable water and wastewater system 170. In this regard, heaters 202 may be located on any surface where heating to avoid freezing of the wastewater in potable water and wastewater system 170 may be desired. Heaters 202 are flexible. In this regard, when coupling heaters 202 to a plumbing infrastructure, or plumbing device/component. For instance, the plumbing infrastructure may include the tank 176, the conduit 178, the conduit fitting(s) 180, and/or the valve(s) 182) of potable water and wastewater system 170, heaters 202 may take the shape of the plumbing infrastructure. For example, heaters 202 may be conformable to a radius of curvature of the plumbing infrastructure.

Figure 3A:
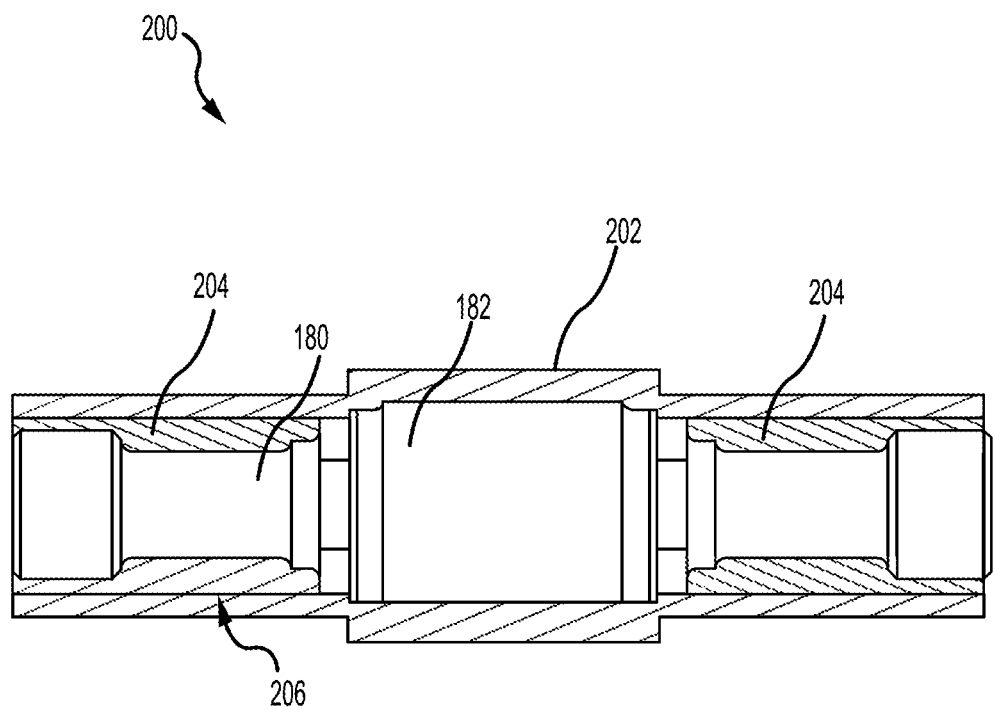
FIG. 3A illustrates a silicone heater assembly with a thermal pad installed, in accordance with various embodiments.
Figure 3B:
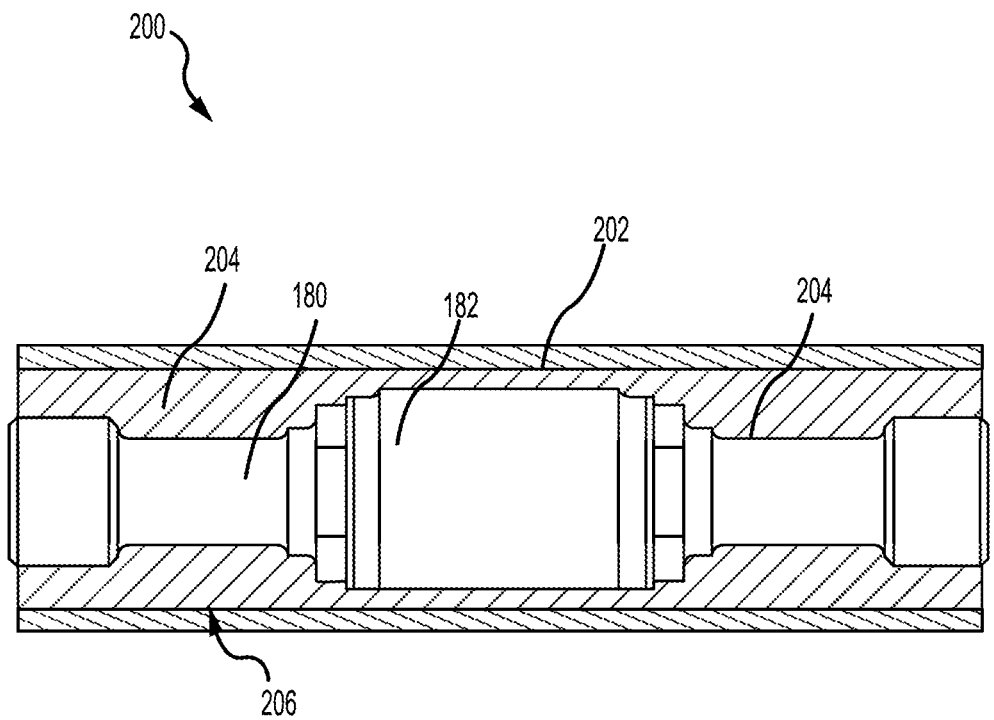
FIG. 3B illustrates a silicone heater assembly with a thermal pad installed, in accordance with various embodiments.

With reference to FIGS. 3A and 3B, additional details of a silicone heater assembly 200 are illustrated. Silicone heaters are designed to achieve surface contact between a heater and a fitting, for instance, or the adjacent component (e.g., the plumbing infrastructure/plumbing device) it is intended to heat. However, when such adjacent component has a complex geometry, the majority of the surfaces are not able to maintain contact due to molding complexity and tool cost. For instance, a heater with stepped features is installed around a plumbing infrastructure with complex geometry (e.g., a valve body, tubes with hex fitting etc.). The heater inner surface is aligned with the stepped feature on the fitting to avoid the molding complexity. Although there is no surface contact, the heating element is installed in those areas to avoid cold spots within the heater. The power generated will be transferred to the fitting through convention in the air medium. The air medium/air gap has a conductivity of 0.025 W/m-K As the cold air within the heater will be continuously circulating, the significant portion of the power will be loss to ambient environment. Accordingly, the system is not as thermally efficient and needs additional power to compensate the loss. Further, the heating is not uniform, and the non-supported portion of the heater may be effected from vibration.

However, in the silicone heater assembly 200, high surface contact (e.g., 100% of the plumbing infrastructure may be covered) may be maintained between the heater and the fitting in order to avoid heat loss. The silicone heater assembly 200 comprises a heater 202 (e.g., a heating element) and at least one thermal pad 204. The at least one thermal pad 204 is configured to fill the gap between the heater 202 and the fitting 180. Typically, high heat transfer can be expected when the heater 202 and the fitting 180 have surface contact. The thermal pad 204 is a high thermal conductive material with an inclusive range of 15-20 W/m-K (e.g., 15 W/m-K, 17 W/m-K, etc.). The thermal pad 204 may be made from silicone or non-silicone based material which can aid to transfer most of the heat to the fitting 180.

The thermal pad 204 is configured to couple (e.g., attached, adhered, etc.) to an inner surface 206 of the heater 202. For instance, the thermal pad 204 may be coupled to the inner surface 206 at a location where the contact between the heater 202 and the fitting 180 is not achieved. For instance, when the heater 202 is configured in a step formation aligning with the fitting 180 and the valve 182, air gaps are formed between the heater 202 and the fitting 180 whereas the heater 202 directly contacts the valve 182. Accordingly, the thermal pad 204 fills such air gaps. In various embodiments, as shown in FIG. 3B, the thermal pad 204 may be coupled to the entire inner surface 206 of the heater 202, where the heater 202 does not have a stepped configuration, and is configured to deform around the contours of the fitting 180 and the valve 182. As such, the air gaps are reduced and/or eliminated and conductivity is improved.

In various embodiments, the thermal pad 204 is manufactured in a tubular form. Accordingly, the thermal pad 204 is configured to be slid over the plumbing infrastructure it is configured to heat (e.g., the conduit 178, the fitting 180, the valve 182, etc.). For instance, the thermal pad 204 acts as a sleeve. In various embodiments, the at least one thermal pad 204 includes two thermal pads 204. For instance, the valve 182 in coupled to a fitting 180 on each side of the valve 182. As such, each fitting 180 is configured to couple with a thermal pad 204. The thermal pad 204 is configured to be installed prior to the installation of the heater 202. The thermal pad 204 is configured to be compatible with an adhesive which is compatible with the silicone heater to attach to the inner surface 206. The thermal pad 204 is configured to be flexible and light weight. For instance, the thermal pad 204 may be a high metalized silicone (e.g., a polymer with metallic particles in between, such as aluminum, copper, etc.). Accordingly, the thermal pad 204 is easy to handle.

As described herein, a high-efficient silicone heater assembly is disclosed. The heater assembly achieves 100% surface contact with a fitting, or other component, of any complex geometry. The silicone heater includes high thermal conductive pads. Accordingly, the heater assembly improves heater efficiency by increasing the heat conducting surface, reduces or eliminates the need for a complex heater geometry without adding weight to the system, and reduces or eliminates the impact on the heater from vibration in previously non-supported portions.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A silicone heater assembly, comprising:
   a thermal pad located circumferentially around a plumbing infrastructure to be heated; and
   a heater located circumferentially around the thermal pad;
   wherein the thermal pad is configured to couple to the heater, wherein the thermal pad is configured to conform to a plumbing infrastructure to be heated, and wherein the thermal pad is a high metalized silicone comprising at least one of copper particles or aluminum particles.

2. The silicone heater assembly of claim 1, wherein the thermal pad is configured to couple to an inner surface of the heater.

3. The silicone heater assembly of claim 1, wherein the thermal pad has a varying inner diameter such that the thermal pad is configured to deform around the contours of the plumbing infrastructure and to contact all surfaces of the plumbing infrastructure to be heated such that heat transfer efficiency is increased.

4. The silicone heater assembly of claim 1, wherein the thermal pad is configured in a tubular form such that the thermal pad is configured to be slid over the plumbing infrastructure to be heated.

5. The silicone heater assembly of claim 1, wherein the plumbing infrastructure to be heated is at least one a conduit, a fitting, or a valve.

6. The silicone heater assembly of claim 1, where the thermal pad is configured to be installed prior to the installation of the heater.

7. The silicone heater assembly of claim 1, further comprising an adhesive, the adhesive compatible with the heater and the thermal pad and configured to adhere the heater and the thermal pad.

8. The silicone heater assembly of claim 1, wherein the thermal pad is a high thermal conductive material with the range up to 17 W/m-K.

9. The silicone heater assembly of claim 1, wherein the thermal pad is a silicone based material.

10. An aircraft potable water and wastewater system, comprising:
    a tank;
    a conduit fluidly connected to the tank; and
    a silicone heater assembly coupled to an exterior surface of at least one of the tank or the conduit, the silicone heater assembly including:
    a thermal pad located circumferentially around at least one of the tank or the conduit; and
    a heater located circumferentially around the thermal pad;
    wherein the thermal pad is configured to couple to the heater, wherein the thermal pad is configured to conform to the exterior surface of at least one of the tank or the conduit, and wherein the thermal pad is a high metalized silicone comprising at least one of copper particles or aluminum particles.

11. The aircraft potable water and wastewater system of claim 10, wherein the thermal pad is configured to couple to an inner surface of the heater.

12. The aircraft potable water and wastewater system of claim 10, further comprising a fitting and a valve fluidly coupled to the conduit.

13. The aircraft potable water and wastewater system of claim 12, wherein the heater is configured in a step formation to align with the fitting and the valve such that air gaps are formed radially between the fitting and the heater.

14. The aircraft potable water and wastewater system of claim 13, wherein the thermal pad has a varying inner diameter such that the thermal pad is configured to deform around the contours of at least one of the tank, the conduit, the fitting, or the valve such that the thermal pad is configured to fill the air gaps between the fitting and the heater.

15. The aircraft potable water and wastewater system of claim 12, wherein the heater is configured in a straight formation such that air gaps are formed radially between the fitting, the valve, and the heater.

16. The aircraft potable water and wastewater system of claim 15, wherein the thermal pad is configured to fill the air gaps between the fitting, the valve, and the heater.

17. The aircraft potable water and wastewater system of claim 10, wherein the thermal pad is configured in a tubular form such that the thermal pad is configured to be slid on over a plumbing infrastructure to be heated.

18. The aircraft potable water and wastewater system of claim 10, where the thermal pad is configured to be installed prior to the installation of the heater.

19. The aircraft potable water and wastewater system of claim 10, further comprising an adhesive, the adhesive compatible with the heater and the thermal pad and configured to adhere the heater and the thermal pad.

* * * * *